United States Patent [19]

Stevenson

[11] E Patent Number: Re. 33,696

[45] Reissued Date of Patent: Sep. 24, 1991

[54] COMPOSITE SPRING

[75] Inventor: Andrew Stevenson, Hertford, England

[73] Assignee: The Paton Corporation, Seattle, Wash.

[21] Appl. No.: 536,697

[22] Filed: Jun. 12, 1990

Related U.S. Patent Documents

Reissue of:

[64] Patent No.: 4,817,921
Issued: Apr. 4, 1989
Appl. No.: 149,944
Filed: Jan. 28, 1988

U.S. Applications:

[63] Continuation of Ser. No. 886,753, Jul. 14, 1986, abandoned, which is a continuation of Ser. No. 680,841, Dec. 12, 1984, abandoned.

[51] Int. Cl.[5] ..... F16F 3/10

[52] U.S. Cl. ..... 267/33; 248/621; 248/634; 267/140.4; 267/152; 280/715

[58] Field of Search ..... 267/33, 140.4, 152; 248/621, 634; 280/697, 715

[56] References Cited

U.S. PATENT DOCUMENTS

| | | | |
|---|---|---|---|
| 2,005,089 | 6/1935 | Krebs | 267/33 X |
| 2,230,069 | 1/1941 | Rushmore | 267/33 |
| 2,822,165 | 2/1958 | Boschi | 267/33 |
| 3,037,764 | 6/1962 | Paulsen | 267/292 |
| 3,118,659 | 1/1964 | Paulsen | 267/140.4 X |
| 3,279,779 | 10/1966 | Thomas et al. | 267/292 |
| 3,447,814 | 6/1969 | Siber et al. | 267/292 |

FOREIGN PATENT DOCUMENTS

| | | | |
|---|---|---|---|
| 45497 | 2/1982 | European Pat. Off. | 267/33 |
| 662622 | 7/1938 | Fed. Rep. of Germany | 267/252 |
| 24676 | 2/1977 | Japan | 267/33 |
| 118344 | 2/1983 | Japan | 267/152 |
| 755186 | 8/1956 | United Kingdom | 267/292 |
| 755808 | 8/1956 | United Kingdom | 267/33 |
| 1437525 | 5/1976 | United Kingdom | 267/152 |

*Primary Examiner*—George E. A. Halvosa
*Attorney, Agent, or Firm*—Finnegan, Henderson, Farabow, Garrett & Dunner

[57] ABSTRACT

The spring includes a tubular elastomeric body, preferably rubber, and a coil spring embedded in and bonded to it. The coil spring controls the occurence of symmetric bulging instablity in the body under axial load conditions. This bulging instability occurs sequentially along the length of the body between adjacent coils of the coil spring until it assumes the form of a continuous coil of elastomer.

11 Claims, 2 Drawing Sheets

COMPOSITE SPRING

Matter enclosed in heavy brackets [ ] appears in the original patent but forms no part of this reissue specification; matter printed in italics indicates the additions made by reissue.

This application is a continuation of application Ser. No. 886,753, filed July 14, 1986, now abandoned, which is a continuation of application Ser. No. 680,841, filed Dec. 12, 1984, now abandoned.

BACKGROUND OF THE INVENTION

This invention relates to composite springs and, more particularly, to composite springs made up of natural rubber or other elastomer in combination with a coil spring or other reinforcement. At used herein, the term "stiff" refers to those portions of the force versus deflection curve of the composite spring that are of relatively high spring rate, whether constant slope or generally rising rate and is characteristic of progressively increasing resistance to compressive deformation. The term "soft" refers to and is characteristic of relatively lower spring rate or less resistance to compressive deformation, whether increasing, decreasing or none at all.

In the past, composite springs of this type have provided force/deflection curves in which the spring is soft near the middle of the curve and is stiff at each end. This result is obtained by controlling deformation of the elastomer spring element under certain conditions in which it is deformable according to different but essentially stable characteristics. One example of such a composite spring is found in the U.S. Pat. No. 2,605,099 by Brown. This composite spring is made up of a rubber envelope that has an undulatory wall section reinforced by and bonded to a steel spring. Another generally similar composite spring is found in U.S. Pat. No. 2,822,165 by Boschi.

The principle drawback of these composite springs is that the soft region of the force/deflection curve, if any, is of very limited duration. This is unsatisfactory in some applications in which it is desireable to have a soft region of extended duration. One, but not the only such application, is for vehicular suspension systems and, in particular, suspension systems for automotive vehicles. This is so because ride comfort often is associated with the ride characteristics that are derived from the soft region of the force/deflection curve of the suspension springs.

SUMMARY OF THE INVENTION

Accordingly, the principal object of this invention is to provide a composite spring having a force/deflection curve with a "soft" region of extended duration.

Another object of this invention is to provide a composite spring in which the force/deflection curve is controllable to provide selected "stiff" and "soft" regions in accordance with specific requirements, particularly the provision of "soft" load bearing characteristics over an extended deflection range at a predetermined load.

Another object of this invention is to provide a composite spring of the kind just mentioned that is "tunable" so that it can be adapted easily to the force, deflection and other requirements of specific applications.

These objects are achieved in accordance with principles of this invention by providing a composite spring that comprises a tubular elastomeric body and means for controlling deformation of the body such that the force/deflection curve has two stiff regions, each characterized by essentially stable compression of the body, and an intermediate soft region characterized by unstable but symmetric deformation of the body, preferably in the form of lateral bulging. This instability occurs sequentially at predetermined locations spaced apart along the length of the body until, in one preferred embodiment, it assures the form of a continuous coil of elastomer. Thus it is possible, by controlling the occurrence of this bulging instability, to "tune" the composite spring so that its soft region appears when and persists so long as desired for particular ride characteristics or other specific requirements.

These and other features, objects and advantages of the present invention will become apparent from detailed description and the claims to follow, taken in conjunction with the accompanying drawings in which like parts bear like reference numerals.

DETAILED DESCRIPTION OF THE DRAWINGS

Figure 2:
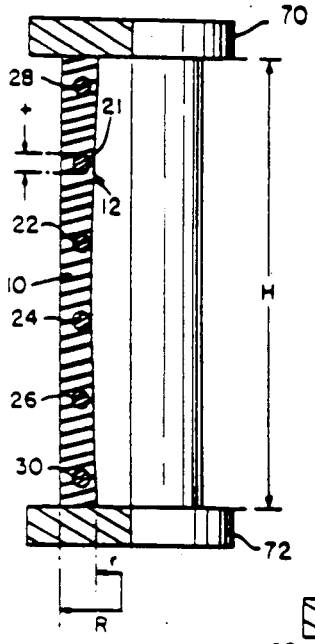
FIG. 2 is a side evelation, partially in longitudinal section, of one presently preferred embodiment of the composite spring of this invention, depicting it in its relaxed (no load) position.

Referring to FIG. 2, one presently preferred embodiment of the composite spring of this invention is comprised of a tubular elastomeric body 10 and reinforcement means in the form of a coil spring 12 embedded in and bonded to the body for controlling deformation of the body such that the spring's force/deflection curve has two stiff regions, each characterized by essentially stable compression of the body, and an intermediate soft region characterized by unstable but symmetric bulging of the body.

Figure 1:
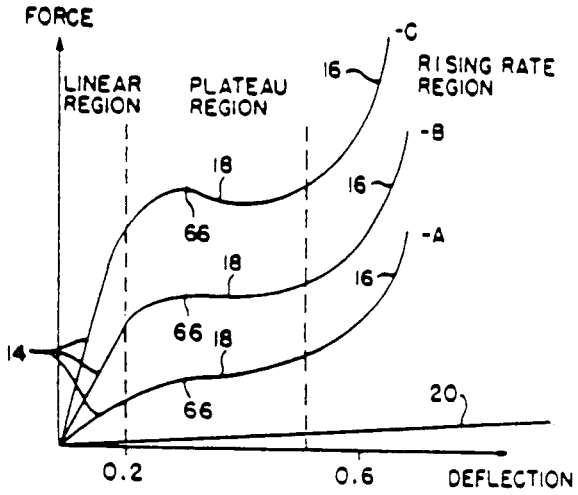
FIG. 1 is a graph of force vs. deflection of one presently preferred embodiment of the composite spring of this invention.

Referring to FIG. 1, a typical force/deflection curve such as that just described includes a lower stiff region 14 in which stiffness is proportional to the shear modulus of the material forming body 10. In this region, essentially only uniaxial compression of the body occurs, giving rise to a generally constant slope curve approximating a linear spring rate. The force/deflection curve further includes an upper stiff region 16 in which stiffness is proportional to the shear modulus, but also is influenced by other factors, as will be described. In this region the body is under compression but, unlike region 14, the spring rae is of rising rate. In both regions 14 and 16, however, the body is deformed under conditions of essentially stable compression.

This invention stems from the discovery that, by causing instead of preventing instability, an intermediate soft region 18 (FIG. 1) of extended duration may be obtained, provided the instability is controlled so that it is localized and symmetric; that is, so that the body does not undergo columnar or other asymmetric buckling. (The terms "symmetric" and "asymmetric" have as a reference the longitudinal axis of the body 10.) This control is accomplished by the coil spring 12. Being embedded in and bonded to the body 10 this spring restrains the cylindrical body wall from bulging along a helical path 19 (FIGS. 3 and 4) that coincides with the individual coils of spring 2. The body is free to bulge laterally, however, in the axial spaces between adjacent convolutions of path 19 body (or between the individual coils of spring 12) at the intervals corresponding to the pitch of spring 12. Thus, the composite spring appears as a rubber coil spring, in which each individual "coil" is formed by one of these lateral bulges.

Figure 3:
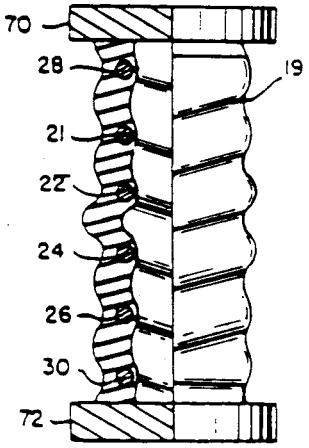
FIG. 3 is a side elevation generally similar to FIG. 2, depicting the FIG. 2 spring under axial load during the formation of symmetric bulging instability.
Figure 4:
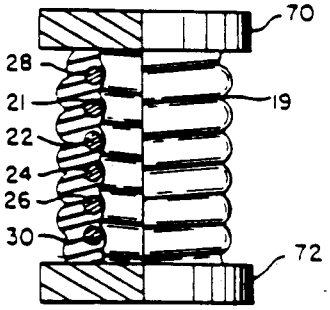
FIG. 4 is a side elevation generally similar to FIG. 2, depicting the FIG. 2 spring under axial load at the completion of the formation of symmetric bulging instability.

In its undeflected state, the composite spring of this invention has a simple cylindrical wall form that appears rectilinear in longitudinal section, as shown (FIG. 2). As a columnar or axial load is applied to body 10, uniaxial compression occurs until the body has been deflected about twenty percent of its unloaded length, or about 0.2H (FIG. 1). It is at this deflection that local symmetric bulging instability begins to appear in sequence between adjacent coils of spring 12. The force/deflection curve has by now progressed upward along and through region 14 and is entering region 18. As depicted in FIGS. 1 and 3, as deflection continues beyond about 0.2H, this symmetric bulging instability appears as lateral outward bulging between adjacent coils of spring 12, first near the middle of body 10, as shown (FIG. 3) and subsequently between other adjacent coils. As a consequence, the external surface of the composite spring increasingly acquires an undulatory configuration. The duration of region 18 corresponds to the range of deflection during which the symmetric bulging instability grows toward and eventually assume a continuous coil configuration, as shown (FIG. 4). With continued deflection beyond about 0.6H, adjacent undulations contact and "bottom out" upon one another, as depicted in FIG. 4, and further growth of the bulging instability essentially ceases. Continued deflection therefore produces further compression of the body along region 16 of the force/deflection curve (FIG. 1) under conditions of uniaxial compression similar to region 14, except that further bottoming of the adjacent undulations produces an increasing effective shape factor and hence a rising instead of linear spring rate.

An important aspect of the present invention is that the composite spring performance is the result of the cumulative effects of the individual rubber "coils": that is, the segments of the body between adjacent active coils of spring 12. In the single intracoil body segment depicted in FIG. 5, the localized effects of axial compression appear as both inward and outward bulging of its inner wall 40 and its outer wall 50, respectively. As depicted by broken lines, the magnitude of the inward bulging of wall 40 is substantially less than that of the outward bulging of wall 50 under axial load conditions. The inner and outer circumferential or hoop strains in and adjacent to walls 40 and 50 cause the relatively incompressible material forming the body segment to "flow" radially outward, producing the intracoil lateral bulging and the overall appearance of a rubber coil spring as illustrated in FIGS. 2–4. These strains become increasingly positive with increases in axial compression, and are distributed axially along the bulging surface such that the maximum strain appears about midway between adjacent coils of spring 12 and are zero adjacent the coils themselves. The "flow" obtained as a result of this strain distribution causes the body segment to deflect momentarily in an unstable manner as if it were buckling.

Figure 5:
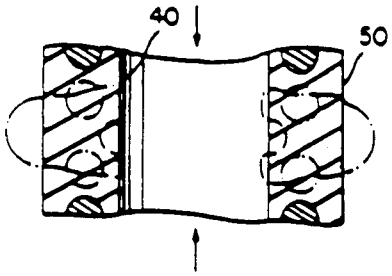
FIG. 5 is a longitudinal section of one intracoil segment of the FIG. 2 spring, depicting the manner in and the extent to which its inner and outer walls bulge under axial load.
Figure 6:
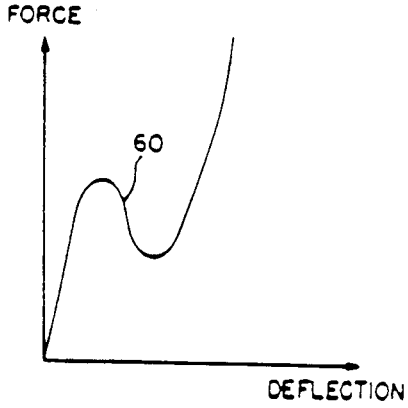
FIG. 6 is a graph of force vs. deflection of a FIG. 5 segment.
Figure 7:
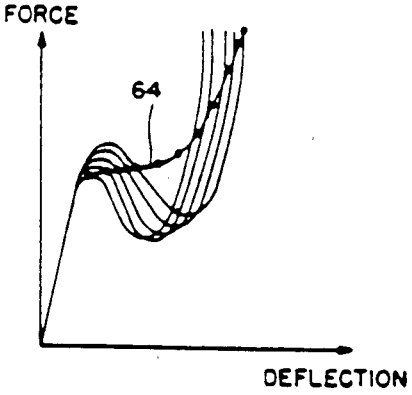
FIG. 7 is a graph of force vs. deflection of five FIG. 5 segments.

This may be understood by reference to the force/deflection behavior of each of the FIG. 5 intracoil body segments or rubber "coils", first individually and then cumulatively. Individually, each rubber coil has a force deflection curve that resembles that of the composite spring, except that, as depicted in FIG. 6, the curve has a region 60 of negative slope. This is indicative of the occurrence of symmetric bulging instability within the rubber coil. Cumulatively, the bulging instability commences with the rubber coils near the middle of the body, and proceeds toward the ends of the body in alternate sequence. This is depicted in FIG. 3, in which bulging instability between coils 22 and 24 is illustrated as being the first to occur, and will be followed by similar instability occurrences between coils 21, 22 or 24, 26, as the case may be. Consequently, the rubber coils tend to reach the point of symmetric bulging instability sequentially, so the cumulative effects of coil instability occurrences appear as a plurality of the FIG. 6 force/deflection curves. As depicted in FIG. 7, the force/deflection curve for the composite spring therefore appears as a superposition of multiple FIG. 6 force/deflection curves, from which an average force/deflection curve 64 for the composite spring may be derived. In making this derivation, the negative slope regions of the individual rubber coils are offset by contrary effects of the other rubber coils that are not then manifesting this mode of deflection. Curve 64 therefore has a plateau-like region that corresponds to region 18 of the FIG. 1 curve.

Referring again to FIG. 1, this plateau-like region may occur at a predetermined load condition, as depicted by curves A, B and C. The manner in which this is accomplished is described presently. As will be apparent from FIG. 1, the slope of this region, whether positive, zero or even negative, may vary, depending upon the load condition at which the instability yielding the soft spring behavior occurs and other factors. As a consequence, the actual axial deflection force present during the occurrence of the instability may in some cases vary in accordance with the point along region 18 selected as the spring design load, or the load level from which the spring is subjected to positive and negative load inputs under the expected service conditions. The selection of this design load will of course depend upon specific application. For example, in most vehicular suspension applications, it should be desirable to select a design load at point 66 (FIG. 1), corresponding to the onset of region 18, to yield a soft ride over the maximum available region of suspension deflections. The degree of softness and the extent to which it may be desired to introduce some stiffness within or bounding this deflection range is controllable by "tuning" the spring according to further principles of this invention.

The occurrence of symmetric bulging instability is controllable so that the composite spring may be "tuned" such that its soft region 18 (FIG. 1) appears when and for the duration desired. Among the factors that lend to this control are: wall thickness and length of the body; the size, location, and spacing of the coils of spring 12; the properties of the material of which the body is composed; and other factors that will become apparent from the description and claims to follow.

The thickness of the body wall relative to coil spacing influences the occurrence of bulging instabilities, the thinner the wall for a given coil spacing the greater the tendency for the body to bulge. It is preferred that the bulging instability occurs in a predictable sequence in order to control the offsetting effects of the FIG. 5 individual intracoil body segments. It is further preferred that the bulging instability occurs first at or near the middle of the body and progress toward its ends from there. To accomplish this end, the body wall should be thinner at the middle of the body and become progressively thicker proceeding toward its ends. It is further preferred that the bulging instability protrudes outwardly between the spring coils, rather than inward to prevent or minimize undesirable surface stresses. To maximize the tendency toward such outward bulging, spring 12 should be embedded within body 10 nearer wall 40.

The number of active coils, coil diameter, and length of the body all are additional stability factors ("Active" coils means all but the end coils, which constitute "inactive" coils. As depicted in FIG. 2, the active coils are designated by reference numerals 21, 22, 24 and 26 and the inactive coils are designated by reference numerals 28 and 30.) For example, the greater the number of active coils or greater the spacing between coils, the greater the tendency of the body as a whole to buckle asymmetrically under columnar loading. If the number of active coils is excessive, the body is in essence divided into so many of the FIG. 5 intracoil body that it tends to shift into asymmetric deformation conditions unpredictably. Too few active coils engendered by excessive intracoil spacing, on the other hand, promotes asymmetric buckling within the individual segments.

The wire diameter or cross-sectional size of the individual coils of spring 12 is still another stability factor. In the absence of sufficient reinforcement due to inadequate coil diameter, the body tends towards assymetric buckling, depending upon its length, in accordance with well known principles of columnar loading. If its individual coils are too large in diameter, however, spring 12 assumes a greater proportion of the load carrying capacity as depicted by curve 20 in FIG. 1, and the beneficial effects of elastomer loading are correspondingly sacrificed. The individual coils should not be exposed and therefore preferably are of a maximum diameter that is somewhat less than the thickness of the body wall. In many practical cases, however, the individual coil diameter will be substantially less than this wall thickness.

These considerations may be expressed as follows:

(a) Stability factor (S)

$$S = \frac{(R - r)n}{2H} \quad (1)$$

(b) Reinforcing efficiency factor (E)

$$E = \frac{(R - r)}{t}$$

Where (as depicted in FIG. 1):

H = total column height or length of body 10 n = number of active coils r = internal radius of body 10

R = external radius of body 10 t = coil wire diameter of spring 12

(R − r) = body wall thickness

Preferably the stability factor(s) set forth in (1) above is between about 0.03 and 0.8 and most preferably is between about 0.05 and 0.2. Preferably the reinforcement efficiency factor (E) set forth in (2) above is between about 0.03 and 5 and most preferably is between about 0.05 and 3. In addition to the foregoing, unacceptable instabilities are likely to occur whenever the ratio R/2H is less than about 0.1.

It is possible to control the point along the FIG. 1 vertical force axis at which region 18 will occur, in accordance with the material properties or wall thickness of body 10, or both. For a given spring construction, an increase or decrease in the hardness or shear modulus of the body material should produce a corresponding variation in region 18 up and down along the force axis. Referring to FIG. 1, curves A, B, and C respectively represent the effects of progressive increases in shear modulus of the body material used. Likewise, for a given shear modulus or material hardness, a similar variation is attainable by increasing or decreasing the wall thickness (R − r) of body 10 (FIG. 2). As a consequence, the composite spring may be constructed with a predetermined design load at which region 18 and its associated softness will occur. Variations in regions 14, 16 and 18 may also be achieved by adjusting the number of active coils within the limits set by (1) and (2) above, or by adjusting the pitch of spring 12, or both. This is particularly advantageous in vehicular suspension applications in which it is desireable to "tune" the suspension spring elements to provide soft ride effects at a certain design load.

It presently is preferred to form body 10 of natural rubber compounded with the usual ingredients to produce an engineering grade of vulcanized rubber, although suitable synthetic elastomers or blends of natural rubber with synthetic elastomers may be used. In addition to acting as the primary load bearing material, the rubber provides attenuation of vibration or shock transmitted from the unsprung mass to the sprung mass by means of both isolation and damping. Natural frequency is reduced by decreasing the spring stiffness for a constant spring mass or by increasing the sprung mass at constant stiffness. With the rubber coil spring of the present invention, the static and dynamic stiffness at design load is low and the natural frequency is also low, with corresponding good vibration attenuation. The rubber coil spring provides increasingly effective isolation of the sprung mass from disturbances applied at frequencies above the natural frequency of the spring-/mass system, such that, as its resilience is increased, vibration attenuation is reduced. The rubber coil spring has the further advantages of being much less susceptible to the transmission of higher order harmonics than an all-metal spring, providing inherent damping that, in most practical applications, is substantially greater than that of an all-metal spring and reducing the effects of any resonance conditions that occur when a disturbing frequency at the natural frequency of the spring/mass system is encountered.

It is a well known consequence of increasing the inherent damping of the rubber compound that the "set" remaining after the removal of a compression load will increase, as will the creep under load. These effects could lead in a particular application to a gradual reduction in the length of the spring and hence in the height of the sprung mass; for example, they could affect bumper height in certain vehicle suspension applications. These effects may be controlled and kept within acceptable limits, however, by precompressing the rubber coil spring prior to installation. It is well known that physical creep rates in rubber are approximately constant with the logarithm of time typically involved with most practical vehicle suspension applications. Thus, the effects of creep may be minimized or eliminated simply by providing precompression or prestressing of a rubber coil spring unit for a period of time calculated to compensate for the amount of creep anticipated for the service life of the spring.

It presently is preferred to use the coil spring 12 as the reinforcement between which the localized bulging instability is formed, and to both embed the spring in and bond it to the rubber forming the body 10. Any suitable rubber bonding agent may be used to accomplish this. It will be recognized, however, that other types of forms of hoop-like restraints such as tire cord or fibers arranged in a spiral pattern generally could be used in place of or in combination with spring 12. Another possible construction is to bond separate rings together in a stacked relationship, with appropriate dividers bonded between them to promote lateral bulging. Neither these rings nor body 10 need be of circular transverse cross section, and could be of oval, multi-flat sided or other cross-sections that yield acceptable deformation behavior in accordance with the general principles of this invention. The spring 12 itself preferably is of metallic composition, although it could be formed of reinforced fibers, plastic or other nonmetallic compositions having suitable structural properties. Likewise, it may not always be necessary to bond the spring to the rubber, or to embed it completely within the body wall, or both, provided the frictional and other mechanical and thermal effects associated with these variations in construction produce satisfactory results.

The rubber coil spring as illustrated and described thus far is intended for axial columnar loading. As depicted in FIG. 1, the ends of body 10 are planar and transverse to its longitudinal axis. This composite spring therefore is suitable for axial columnar loading between parallel platens as shown in FIGS. 70 and 72. It may, however, be adapted easily for loading by non-parallel platens and even by one or more pivoted platens, as may be encountered for example in certain automotive suspension involving pivotal A-arms or yokes. In these applications, the ends of the body may be formed at angles to its longitudinal axis, or the platens may be angled correspondingly, or both, provided the resultant force vector is along the longitudinal axis. This could accommodate the swinging motion of the sprung or unsprung mass, to the extent required to achieve the controlled symmetric bulging instabilities described earlier. It may also easily be adapted for use with non-planar ends; for example, with spring ends cut square rather than ground flat, producing a step like end to the RSC which can locate into a suitable or fixture.

To illustrate the foregoing principles of this invention, but not by way of limitation, the following example is disclosed.

EXAMPLE

Figure 8:
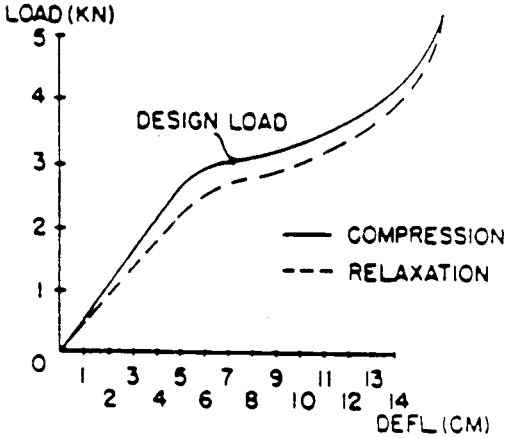
FIG. 8 is a graph of force vs. deflection of a first examplary embodiment of the FIG. 2 spring.

A rubber coil spring generally similar to that illustrated in FIG. 2, in which internal radius (r) is 41 mm, outer radius (R) is 55 mm, unrestrained length (H) of 300 mm, five active coils, and formulated of natural rubber of 50 IRHD. The force/deflection curve and design load for this spring is depicted in FIG. 8. This spring should yield generally "soft" ride characteristics in a vehicle suspension system.

Although one presently preferred embodiment of the invention has been illustrated and described herein, variations will become apparent to one of ordinary skill in the art. Accordingly, the invention is not to be limited to the specific embodiment illustrated and described herein, and the true scope and spirit of the present invention are to be determined by reference to the appended claims.

The embodiments of the invention in which an exclusive property or privilege is claimed are defined as follows:

1. A spring having a force vs. deflection curve with a constant rate region which persists for about the initial 20% of its columnar deflection, a rising rate region which persists for about the last 40% of its columnar deflection, and an intermediate plateau region, said spring comprising: an elongated tubular elastomeric body having a generally straight sided longitudinal profile and a matching inner surface under zero columnar deflection, and a coil spring embedded in said body for controlling deformation of said body such that said plateau region persists for a substantial portion of such columnar deflection so long as the occurrence of a series of symmetric bulging instabilities at a plurality of locations spaced apart along the length of said body under a predetermined axial load condition, said body and said coil spring being constructed and arranged according to the following:

$$S = \frac{(R - r)n}{2H} \quad \text{(a)}$$

$$E = \frac{(R - r)}{t} \quad \text{(b)}$$

where

S = stability factor

E = reinforcing efficiency factor

H = total axial length of said body, n = the total number of coils of said coil spring, r = the internal radius of said body, R = the external radius of said body, (R − r) = the wall thickness of said body, and t = the wire diameter of the coils of said coil spring, wherein the value of S is between about 0.05 and 0.2 and the value of E is between about 0.05 and [0.2] *3*.

2. The spring of claim 1, wherein said bulging instability assumes the form of a continuous coil of elastomer.

3. The spring of claim 1, wherein said coil spring is bonded to said body.

4. The spring of claim 1, wherein the ratio of R/2H is less than about 0.1.

5. The spring of claim 1, wherein said body is composed of a material having a hardness selected in relation to said predetermined load condition.

6. The spring of claim 1, wherein said body is composed of a natural rubber compound.

7. The spring of claim 6, wherein said compound is precompressed.

8. The spring of claim 6, wherein the ends of said body are constructed and arranged with respect to the direction of force application.

9. A spring having a force vs. deflection curve with a constant rate region which persists for about the initial 20% of its columnar deflection, a rising rate region which persists for about the last 40% of its columnar deflection, and an intermediate plateau region, said spring comprising:

an elongated tubular elastomeric body having first and second longitudinal ends and substantially concentric inner and outer wall surfaces extending between said first and second ends, said inner and outer wall surfaces defining therebetween a body having a minimum thickness at a longitudinally intermediate position and having a progressively greater thickness proceeding toward each of said first and second ends under zero columnar deflection; and a coil spring embedded in said body controlling deformation of said body such that said plateau region persists for a substantial portion of such columnar deflection so long as the occurrence of a series of symmetric bulging instabilities at a plurality of locations spaced apart along the length of said body under a predetermined axial load condition, the occurrence of said bulging instabilities commencing proximate said intermediate position of said body;

wherein said body and said coil spring are constructed and arranged according to the following:

$$S = \frac{(R - r)n}{2H} \quad \text{(a)}$$

-continued $$E = \frac{(R - r)}{t} \quad \text{(b)}$$

where

S = stability factor,

E = reinforcing efficiency factor,

H = total axial length of said body, n = the total number of coils of said coil spring, r = the internal radius of said body, R = the external radius of said body, (R − r) = the wall thickness of said body, and t = the wire diameter of the coils of said coil spring, wherein the value of S is between about 0.05 and 0.2 and the value of E is between about 0.05 and [0.2] *3*.

10. A spring having a three part spring curve made up of a constant rate region, a rising rate region and an intermediate plateau region, said spring comprising: an elongated tubular elastomeric body having a wall thickness at one location along its length which is less than its wall thickness at another location spaced from said location; a coil spring embedded in said body; said body and said coil spring being constructed and arranged according to the following:

$$S = \frac{(R - r)n}{2H} \quad \text{(a)}$$

$$E = \frac{(R - r)}{t} \quad \text{(b)}$$

where

S = stability factor,

E = reinforcing efficiency factor,

H = total axial length of said body, n = the total number of coils of said coil spring, r = the internal radius of said body, R = the external radius of said body, (R − r) = the wall thickness of said body, and t = the wire diameter of the coils of said coil spring, wherein the value of S is between about 0.05 and 0.2 and the value of E is between about 0.05 and [0.2] *3*.

11. The spring of claim 10, wherein the ratio of R/2H is less than about 0.1.

* * * * *